United States Patent
Singh et al.

(10) Patent No.: US 11,055,594 B1
(45) Date of Patent: Jul. 6, 2021

(54) ULTRA-HIGH FREQUENCY ACTIVE RADIO FREQUENCY IDENTIFICATION CIRCUIT ELEMENTS FOR DYNAMIC SPATIAL ACTIVATION OF COMMUNICATION DEVICE

(71) Applicant: Bank of America Corporation, Charlotte, NC (US)

(72) Inventors: Shailendra Singh, Maharshtra (IN); Ashutosh Tripathi, Delhi (IN)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 16/908,852

(22) Filed: Jun. 23, 2020

(51) Int. Cl.
G06Q 20/34 (2012.01)
G06K 19/07 (2006.01)
G06K 19/077 (2006.01)
H02J 7/35 (2006.01)
G08C 17/02 (2006.01)

(52) U.S. Cl.
CPC ... *G06K 19/07707* (2013.01); *G06K 19/0704* (2013.01); *G06Q 20/354* (2013.01); *G08C 17/02* (2013.01); *H02J 7/35* (2013.01)

(58) Field of Classification Search
None
See application file for complete search history.

(56) References Cited

U.S. PATENT DOCUMENTS

2011/0215909 A1* 9/2011 Rancien ............ G06K 19/025 340/10.1
2020/0104550 A1* 4/2020 Russell-Clarke .... G06K 7/0056

\* cited by examiner

*Primary Examiner* — Kristy A Haupt
(74) *Attorney, Agent, or Firm* — Weiss & Arons LLP; Michael A. Springs, Esq.

(57) ABSTRACT

Apparatus and methods for securing a communication link. The apparatus may include a microprocessor. The apparatus may include a memory cell. The apparatus may include a photovoltaic circuit. The apparatus may include a radio frequency transceiver circuit. The apparatus may include an organic light emitting diode display circuit. The microprocessor may be embedded in an information card. The memory cell may be embedded in the information card. The photovoltaic circuit may be embedded in the information card. The radio frequency transceiver may be embedded in the information card. The organic light emitting diode display may be embedded in the information card. The display circuit may include an array of separately excitable diode fields. The display circuit may include a display controller that is in electronic communication with each of the fields.

27 Claims, 10 Drawing Sheets

ULTRA-HIGH FREQUENCY ACTIVE RADIO FREQUENCY IDENTIFICATION CIRCUIT ELEMENTS FOR DYNAMIC SPATIAL ACTIVATION OF COMMUNICATION DEVICE

BACKGROUND

Typical information card activation and deactivation approaches do not understand spatial patterns of fraud or suspected fraud. Geographical areas of fraud represent high risk for consumers. Geographical areas of suspected fraud may be represent high risk for consumers. Typical approaches do not provide consumers with tools to configure an information card to be deactivated when the information card enters such areas.

Therefore, it would be desirable to provide apparatus and methods for securing a communication link.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Apparatus and methods for securing a communication link are provided. The link may be between an information card and a merchant. The merchant may be an online merchant. The link may be established by presentation of a number of the card to the merchant for the purchase of goods or services. The apparatus and methods may reduce or eliminate the likelihood that the link will be established in an unauthorized manner.

The apparatus may include a microprocessor. The apparatus may include a memory cell. The apparatus may include a photovoltaic circuit. The apparatus may include a radio frequency transceiver circuit. The apparatus may include an organic light emitting diode display circuit.

The microprocessor may be embedded in an information card. The memory cell may be embedded in the information card. The photovoltaic circuit may be embedded in the information card. The radio frequency transceiver may be embedded in the information card. The UHF active RFID circuit may be embedded in the information card. The organic light emitting diode display may be embedded in the information card.

The photovoltaic circuit may be configured to provide power to the display circuit. The radio frequency transceiver circuit may be configured to receive a radio frequency signal from a mobile computing device. The radio frequency transceiver circuit may be configured to, responsive to the signal, transmit a DISPLAY ON instruction to the microprocessor. The microprocessor may be configured to flow charge from the photovoltaic circuit to the display circuit responsive to the DISPLAY ON instruction.

The display circuit may include an array of separately excitable diode fields. The display circuit may include a display controller that is in electronic communication with each of the fields.

The microprocessor may be configured to provide to the display circuit, after the fields are energized, a digital code. The display controller may be configured to render the code optically in the fields.

The fields may display a color palette corresponding to the code.

The photovoltaic circuit may include a photovoltaic cell. The photovoltaic circuit may include a charge reservoir.

The information card may conform to dimensions defined in ISO/IEC 7810. The microprocessor may be disposed within the dimensions. The memory cell may be disposed within the dimensions. The photovoltaic cell may be disposed within the dimensions. The radio frequency transceiver may be disposed within the dimensions. The organic light emitting diode display circuit may be disposed within the dimensions.

The dimensions include a thickness. The dimensions include a length. The dimensions include a width.

The information card may have a maximum thickness of 0.76 mm. The information card may have a maximum thickness that is in the range 0.1-0.76 mm.

The radio frequency signal may be a first radio frequency signal. The digital code may be a first digital code. The radio frequency transceiver circuit may be configured to receive a second radio frequency signal from the mobile computing device after the first radio frequency signal is interrupted. The microprocessor may be configured to provide to the display circuit a second digital code. The second digital code may be different from the first digital code.

The methods may include receiving at a mobile computing device a multi-spectral optical pattern from the information card. The methods may include deriving, at the mobile computing device, from the optical pattern, a digital request key. The methods may include wirelessly transmitting the key from the mobile computing device to a communication control platform. The methods may include receiving from the platform, at the mobile computing device an authentication key that corresponds to the request key.

The methods may include, at the platform, receiving a location of the card. The methods may include determining that the card does not conform to the activation file. The methods may include deactivating the card. The methods may include providing the location from the UHF active RFID circuit to the platform. The methods may include, before providing the location, wirelessly verifying, at the mobile computing device, that the information card is no more than a predetermined distance from the device.

The methods may include receiving at the mobile computing device a touch-screen instruction to activate the information card. The methods may include, responsive to the touch-screen instruction, generating an activation file includes activation parameters that circumscribe information card activity.

The methods may include transmitting the activation file from the mobile computing device to the platform an activation file.

The file may include a geographic limiter. The geographic limiter may include a distance relative to the mobile computing device.

The methods may include receiving at the mobile computing device a touch-screen coordinate corresponding to a map location.

The touch-screen coordinate may be of a plurality of touch-screen coordinates that correspond to respective map locations. The map locations may define an enclosed map region.

The geographic limiter may include a cartographic attribute. The cartographic attribute may include a place name.

The file may include an altitude limiter. The altitude limiter may include a height relative to the mobile computing device. The altitude limiter may include a floor number.

The file may include a temporal limiter.

Temporal limit may include a calendar attribute. The calendar attribute may include a date.

The file may include a request for a predetermined security profile.

The methods may include, at the platform, receiving a location of the card. The methods may include, at the platform, determining that the card does not conform to the activation file. The methods may include, at the platform, deactivating the card.

The methods may include providing the location from the mobile computing device to the platform.

The methods may include, before providing the location, wirelessly verifying, at the mobile computing device, that the information card is no more than a predetermined distance from the device.

. . .

Illustrative embodiments of apparatus and methods in accordance with the principles of the invention will now be described with reference to the accompanying drawings, which form a part hereof. It is to be understood that other embodiments may be utilized and that structural, functional and procedural modifications or omissions may be made without departing from the scope and spirit of the present invention.

Figure 1:
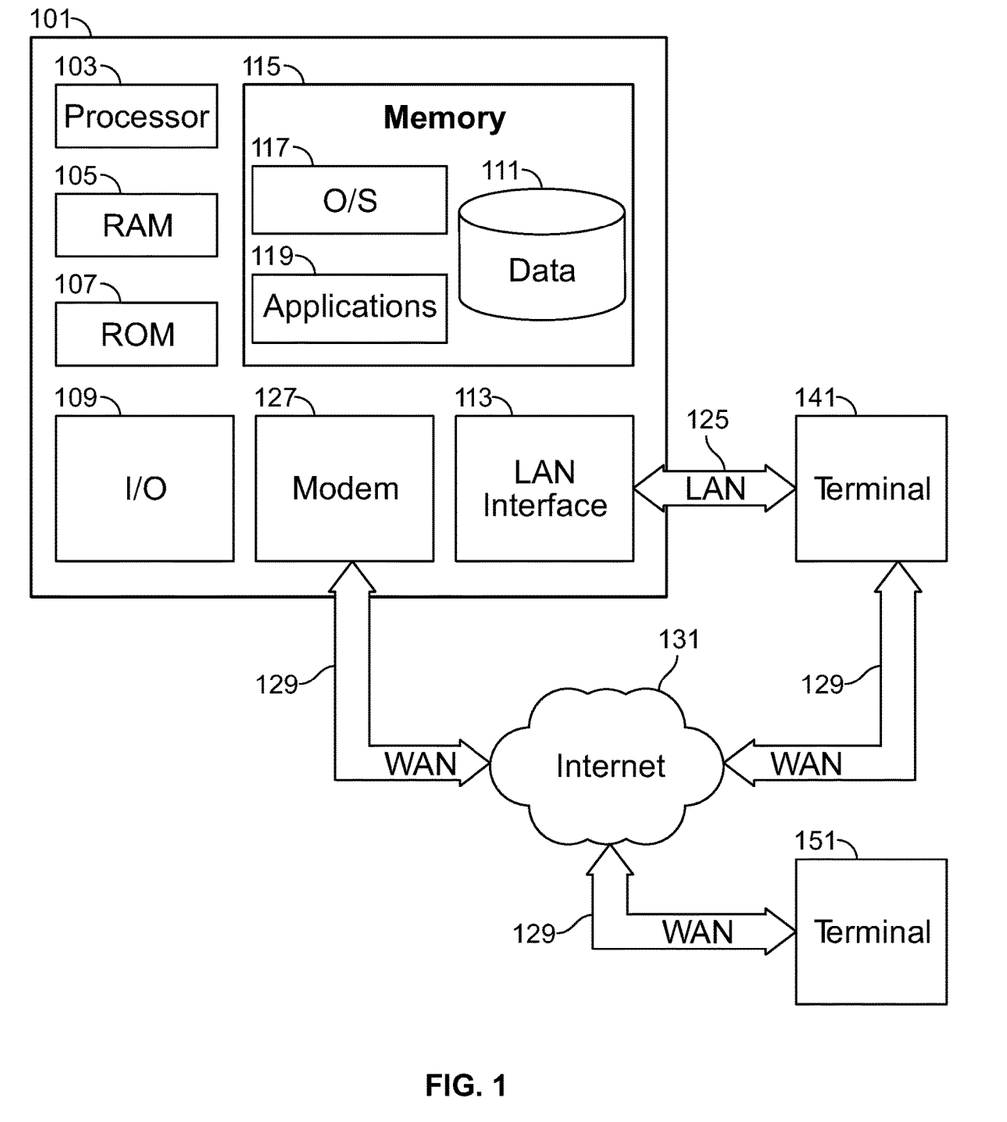
FIG. 1 shows illustrative apparatus that may be used in accordance with principles of the invention.

FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to perform the functions of one or more of the information card, mobile computing device, communication control platform and dynamic spatial mapping engine, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
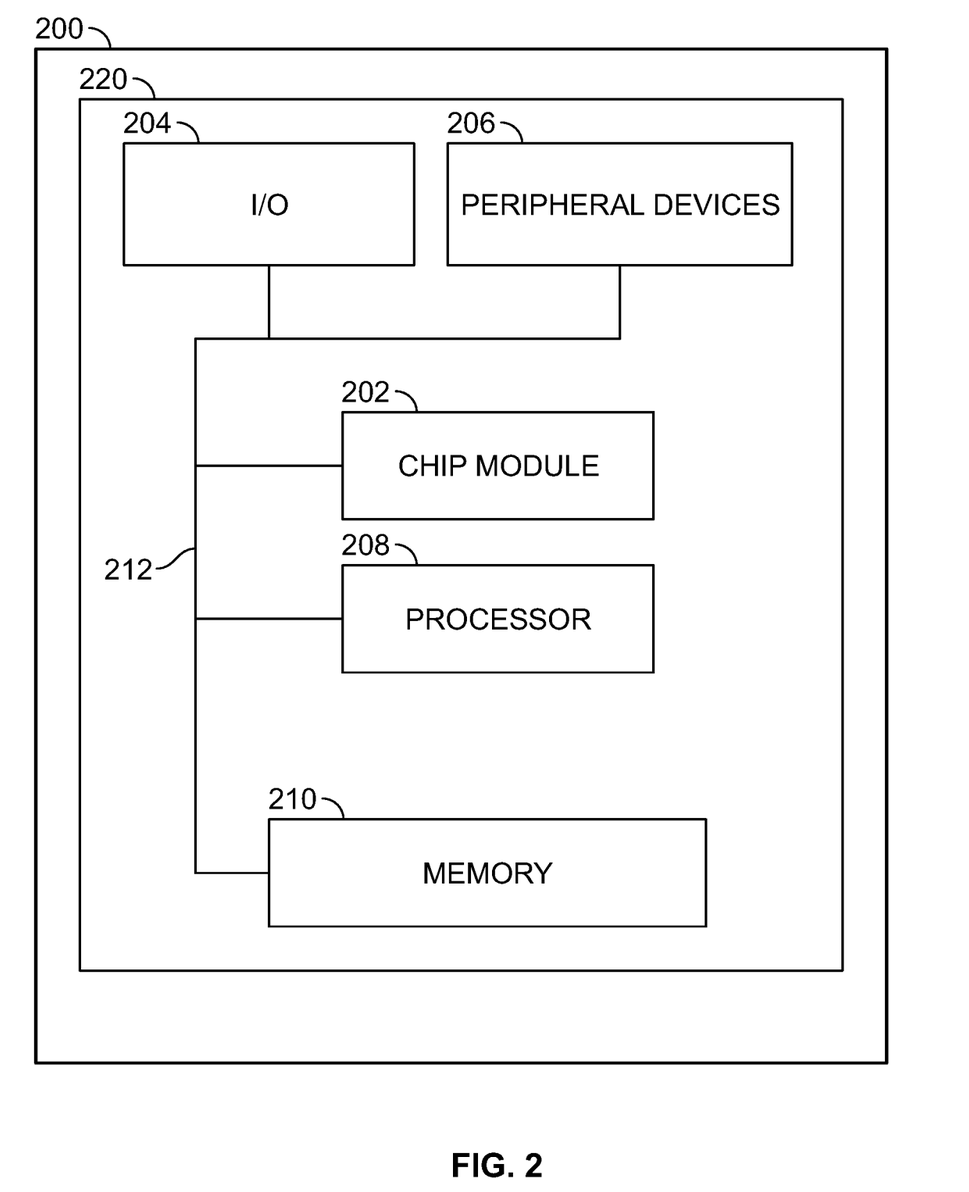
FIG. 2 shows illustrative apparatus that may be used in accordance with principles of the invention.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute a zone, a fraud value, a card location, or perform other methods described herein; and machine-readable memory 210.

Machine-readable memory 210 may be configured to store in machine-readable data structures: tokens, patterns, codes, executor registration information, super-executor registration information, co-executor registration information and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

Figure 3:
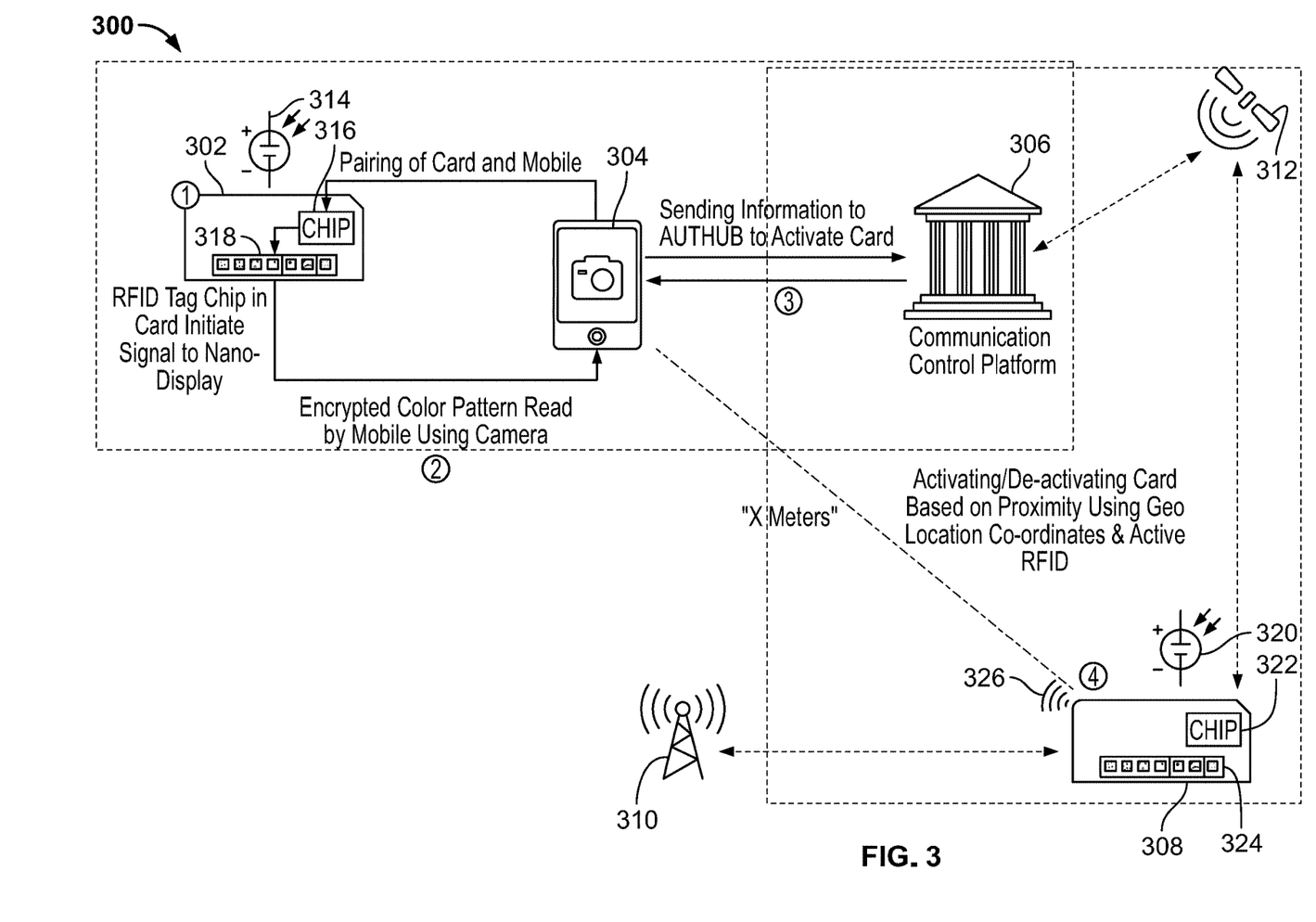
FIG. 3 shows illustrative apparatus in accordance with principles of the invention.

FIG. 3 shows illustrative architecture 300. Architecture 300 may include information card 302. Architecture 300 may include mobile computing device 304. Architecture 300 may include communication control platform 306. Architecture 300 may include communication card 308. Architecture 300 may include cell communication tower 310. Architecture 300 may include satellite 312.

Card 302 may include photovoltaic circuit 314. Card 302 may include microprocessor circuit 316. Card 302 may include light emitting diode display 318.

Mobile computing device 304 may include a cell phone. Mobile computing device 304 may include a camera. Photovoltaic device 314 may provide power to display 318. Display 318 may display a color palette corresponding to an identifier of card 302. Mobile computing device 304 may read the palette. Mobile computing device 304 may decipher the palette. Mobile computing device 304 may pair with card 302 by RFID. Mobile computing device 304 may generate a digital request key based on the palette.

Mobile computing device 304 may transmit the digital request key to communication platform 306. In response, communication platform 306 may transmit to mobile computing device 304 a digital authentication key. Mobile computing device 304 may transmit the authentication key to card 302. Card 302 may be authenticated based on the presence of the authentication key in card 302. Card 302 may be authenticated based on an authentication record stored in communication platform 306. Authentication may include activation.

Card 308 may include photovoltaic circuit 320. Card 308 may include microprocessor circuit 322. Card 308 may include light emitting diode display 324. Card 308 may include UHF active RFID circuit 326.

Cell communication tower 310 may be in wireless communication with communication control platform 306. Satellite 312 may be in wireless communication with communication control platform 306. Card 308 may communicate with tower 310 via UHF active RFID 326. Card 308 may communicate with satellite 312 via UHF active RFID 326. Card 308 may communicate with mobile computing device 304 via UHF active RFID 326.

Card 308 may acquire its location using an on-board GPS circuit. Card 308 may acquire a distance away from mobile computing device 304 based on signal strength between card 308 and mobile computing device 304. Card 308 may acquire its location from a satellite such as 312. Card 308 may communicate its location to communication control platform 306.

Figure 4:
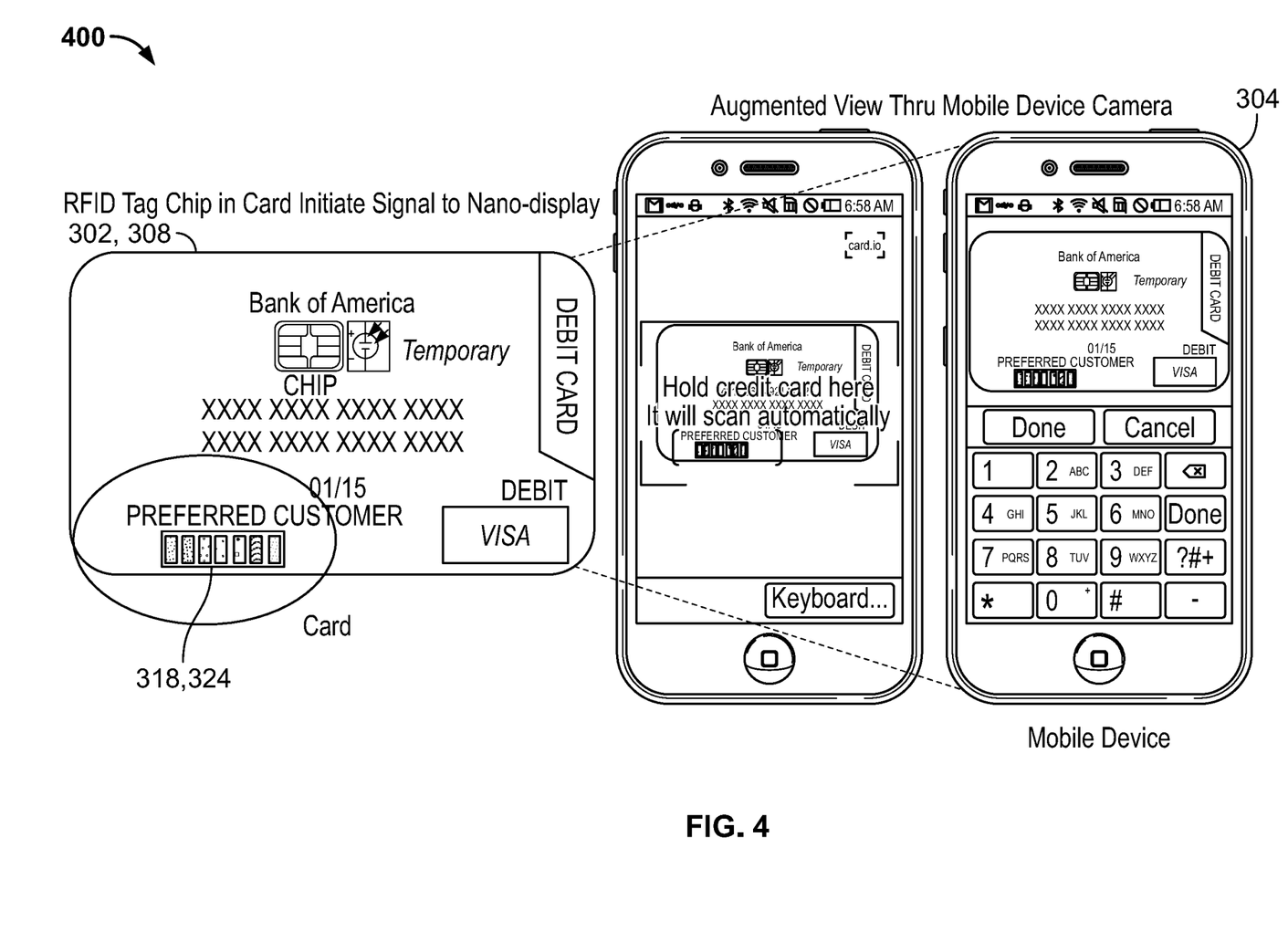
FIG. 4 shows illustrative apparatus in accordance with principles of the invention.

FIG. 4 shows view 400 of a card such as 302 or 308 (shown in FIG. 3) interacting with mobile computing device 304 (shown in FIG. 3). The card may pair with mobile computing device 304. In a paired mode, mobile computing device may receive a digital key from the card by reading a color palette from display 318, 324

For the sake of illustration, the steps of the illustrated processes will be described as being performed by a "system." A "system" may include one or more of the features of the apparatus that are shown in FIGS. 1-4 and/or any other suitable device or approach. The "system" may include one or more means for performing one or more of the steps described herein.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Figure 5:
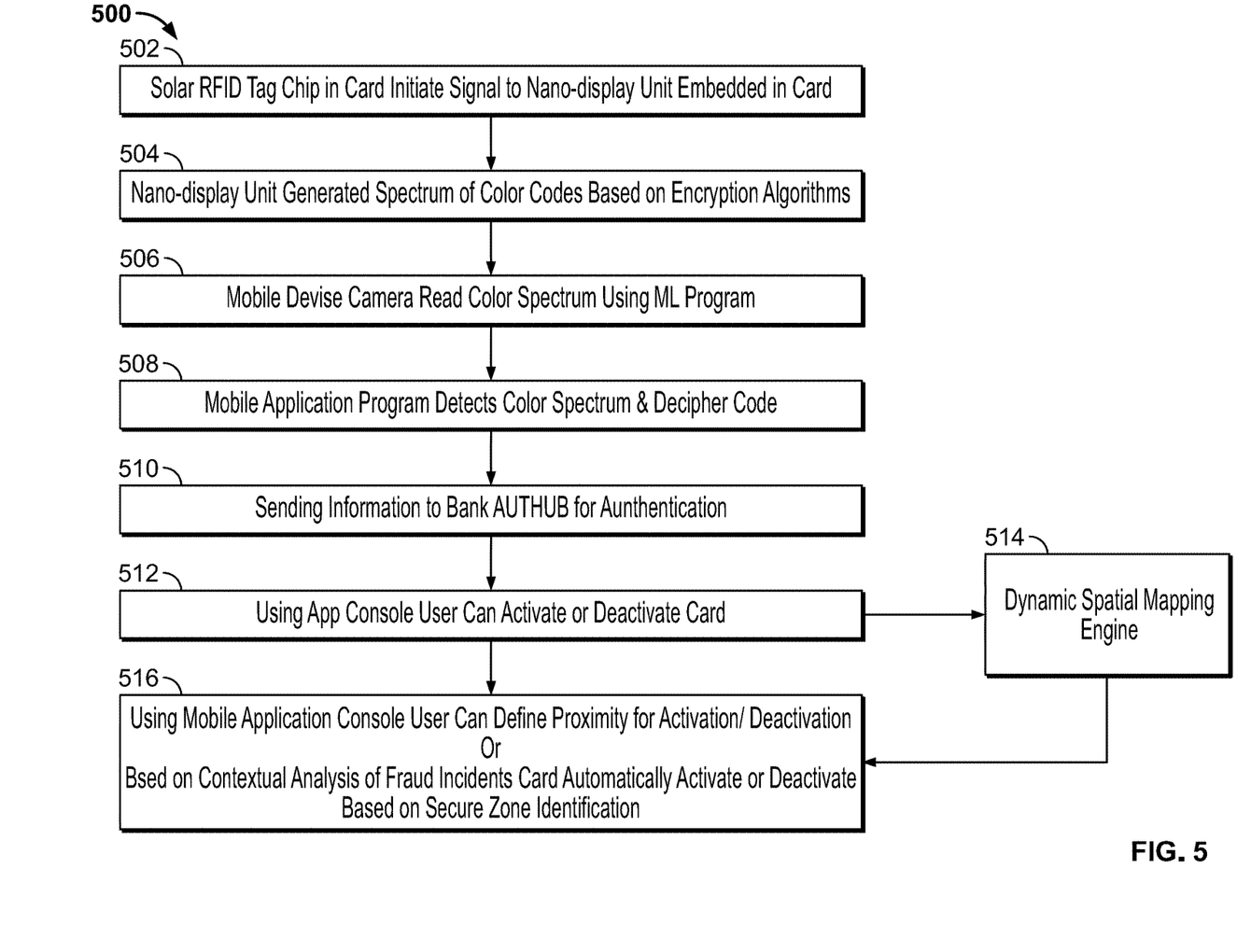
FIG. 5 shows illustrative steps of processes in accordance with principles of the invention.

FIG. 5 shows illustrative process 500 for securing a communication link. Process 500 may begin at step 502. At step 502, a Solar-powered RFID tag Chip in the card may initiate a signal to nano-display unit embedded in the card. At step 504, the nano-display unit may generate a spectrum of color codes based on encryption algorithms. At step 506, the mobile computing device camera may read the color spectrum using a machine learning ("ML") program. At step 508, a mobile computing device application may detect the color spectrum and decipher the code (which may include a request key). At step 510, the mobile computing device may send information from the card to a bank AUTHUB (e.g., communication control platform). The information may provide the communication control platform with a basis upon which to authenticate the card. At step 512, after authentication, a user may use an app console on the mobile computing device to activate or deactivate card.

After step 512, process 500 may continue at step 514. At step 514, the user may interact with a dynamic spatial mapping engine. The dynamic spatial mapping engine may be accessed through the communication control platform. The dynamic spatial mapping engine may be resident on the mobile computing device. At step 516, the user may use the mobile app console to define proximity (of the card to the mobile computing device, of the card to a geographical location, or any other suitable proximity) within which the card is to be activated or, in the alternative, deactivated. At step 516, the user may elect automatically activate or deactivate the card based on contextual analysis of fraud incidents by the communication control platform. The communication control platform may define secure zones for activation.

After step 512, process 500 may continue at step 516.

Figure 6:
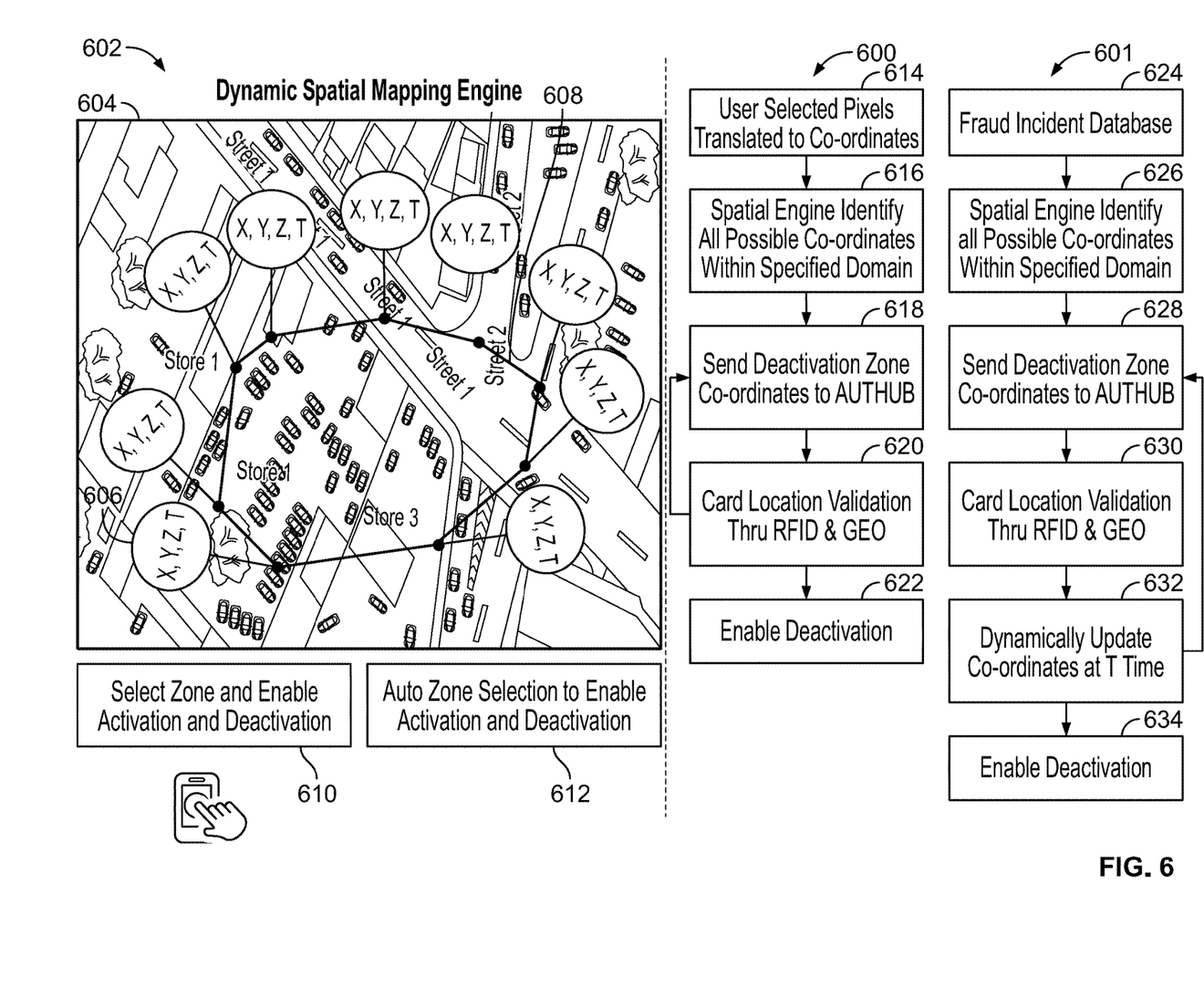
FIG. 6 shows illustrative steps of processes, along with apparatus, in accordance with principles of the invention.

FIG. 6 shows illustrative processes 600 and 601 for securing a communication link.

Illustrative view 602 is a view that the user may have of a screen on the mobile computing device. View 602 shows geographic mapping view 604. View 604 may include coordinates 606 of illustrative polygon 608 in a geographic region. Coordinates 606 at each apex of polygon 608 may include corresponding values in the horizontal plane (x and y), the vertical dimension (z) and time, during which an activation or deactivation state is requested. View 602 shows illustrative user controls 610 and 612. The user may use control 610 to select a zone and enable activation and deactivation. The user may use control 612 to instruct the spatial activation engine to provide automatic zone selection for activation or deactivation.

Process 600 may begin at step 614. At step 614 the app may translate user-selected pixels to geographic coordinates. At step 616, the dynamic spatial mapping engine may identify all possible coordinates within a domain defined by the pixels. At step 618, the dynamic spatial engine may send the zone coordinates to the AUTHUB. At step 620, the card may send the cards current location via UHF active RFID to the AUTHUB. At step 622, the AUTHUB may deactivate the card based on card location with respect to the zones and the current time. The deactivation may be flagged in a data record in the AUTHUB. The deactivation may be flagged in a data record in the card. Process 600 may correspond to control 610.

Process 601 may begin at step 624. At step 624, the dynamic spatial mapping engine may access a fraud incident database. At step 626, the dynamic spatial mapping engine may identify all possible coordinates within a specified domain that is identified as having a high incidence of fraud. At step 628, the dynamic spatial engine may send the zone coordinates to the AUTHUB. At step 630, the card may send the cards current location via UHF active RFID to the AUTHUB. At step 632, the system may update, in AUTHUB, the coordinates corresponding to a change in time T. At step 634, the AUTHUB may deactivate the card based on card location with respect to the zones and the current time. The deactivation may be flagged in a data record in the AUTHUB. The deactivation may be flagged in a data record in the card. Process 601 may correspond to control 612.

Figure 7:
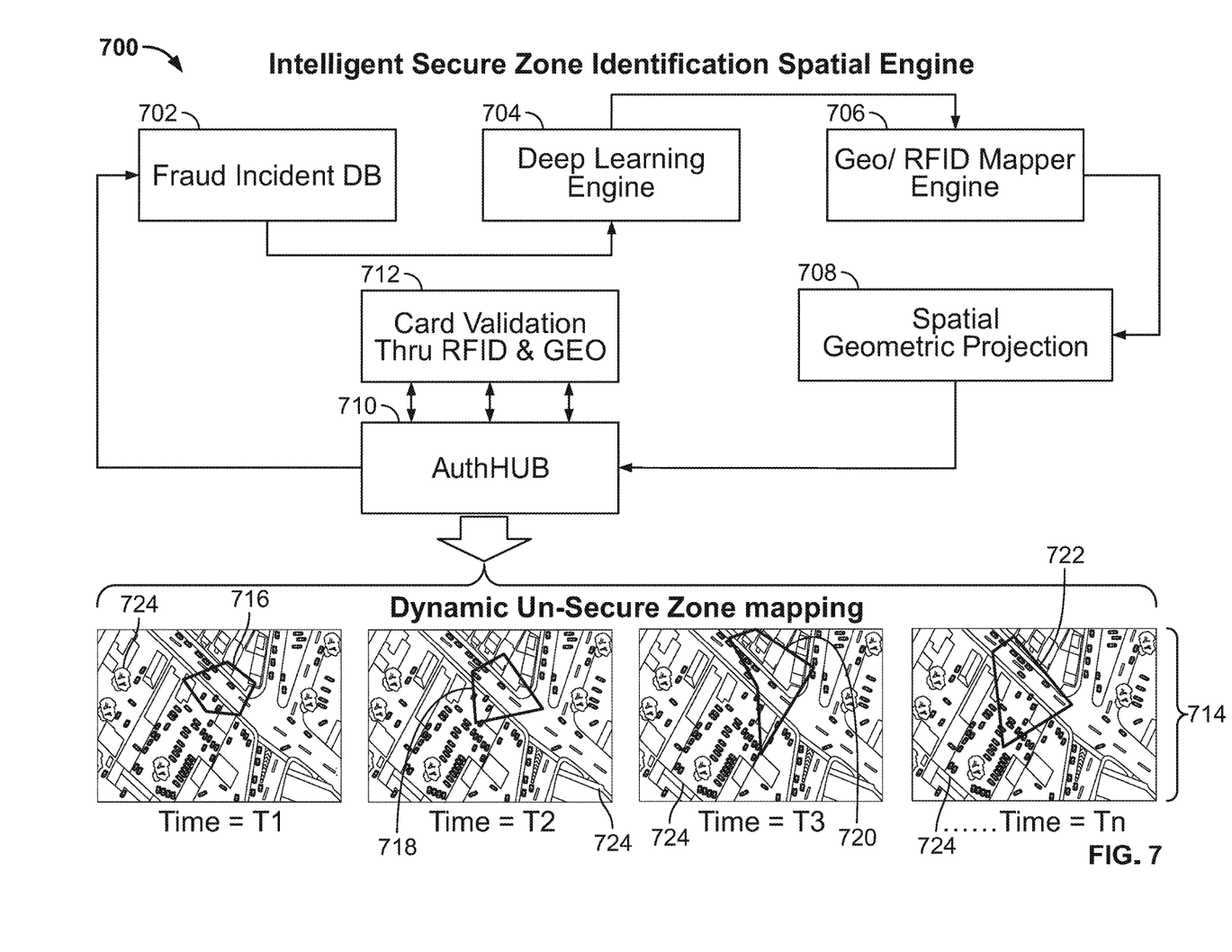
FIG. 7 shows illustrative steps of processes, along with information, in accordance with principles of the invention.

FIG. 7 shows illustrative data flow 700 for securing a communication link. Data may be stored in fraud incident database 702. Database 702 may feed fraud incident data to deep learning engine 704. Deep learning engine 704 may assign fraud likelihood values to geographic zones. The zones may be defined in three spatial dimensions. Deep learning engine 704 may feed the values and zones to Geo/RFID mapper engine 706. Mapper engine 706 may integrate the values and zones into a map. The system may render spatial geometric projection 708 based on the values and the zones. The system may provide the projection to AUTHUB 710. AUTHUB 710 may receive a card validation from card validation (through RFID/GEO) process 712 location and determine a value corresponding to the card location.

Panel 714 shows illustrative zones 716, 718, 720 and 722, corresponding respectively to times T1, T2, T3 and Tn, in region 724. Panel 714 shows that zones 716, 718, 720 and 722 are all in region 724, but differ from each other at the different times.

Figure 8:
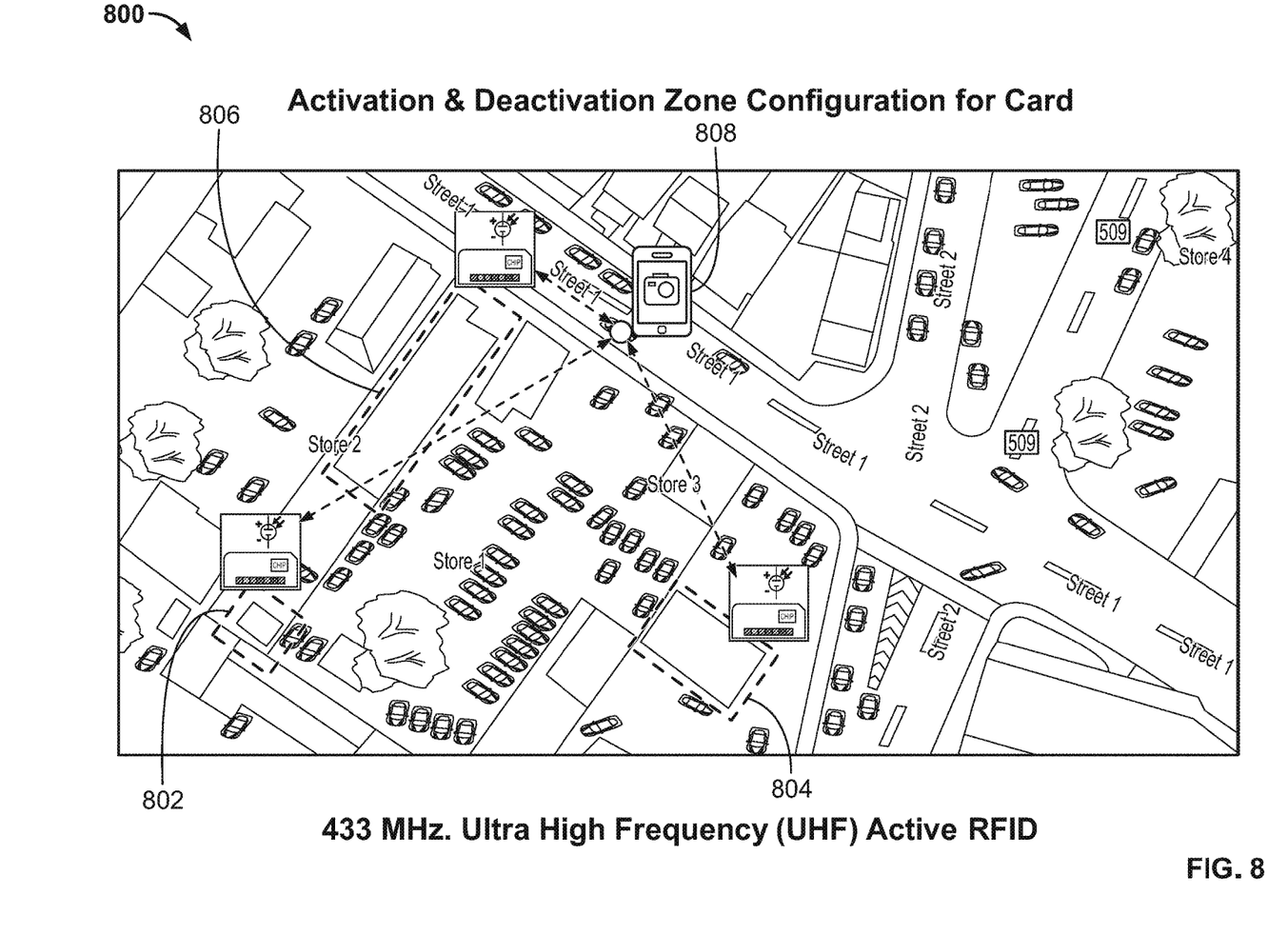
FIG. 8 shows illustrative information in accordance with principles of the invention.

FIG. 8 shows illustrative view 800 of deactivation zones 802, 804 and 806 that may be defined using a mobile computing device such as 808. A user may view 800 on the mobile computing device. The user may add or remove zones using the mobile computing device.

Figure 9:
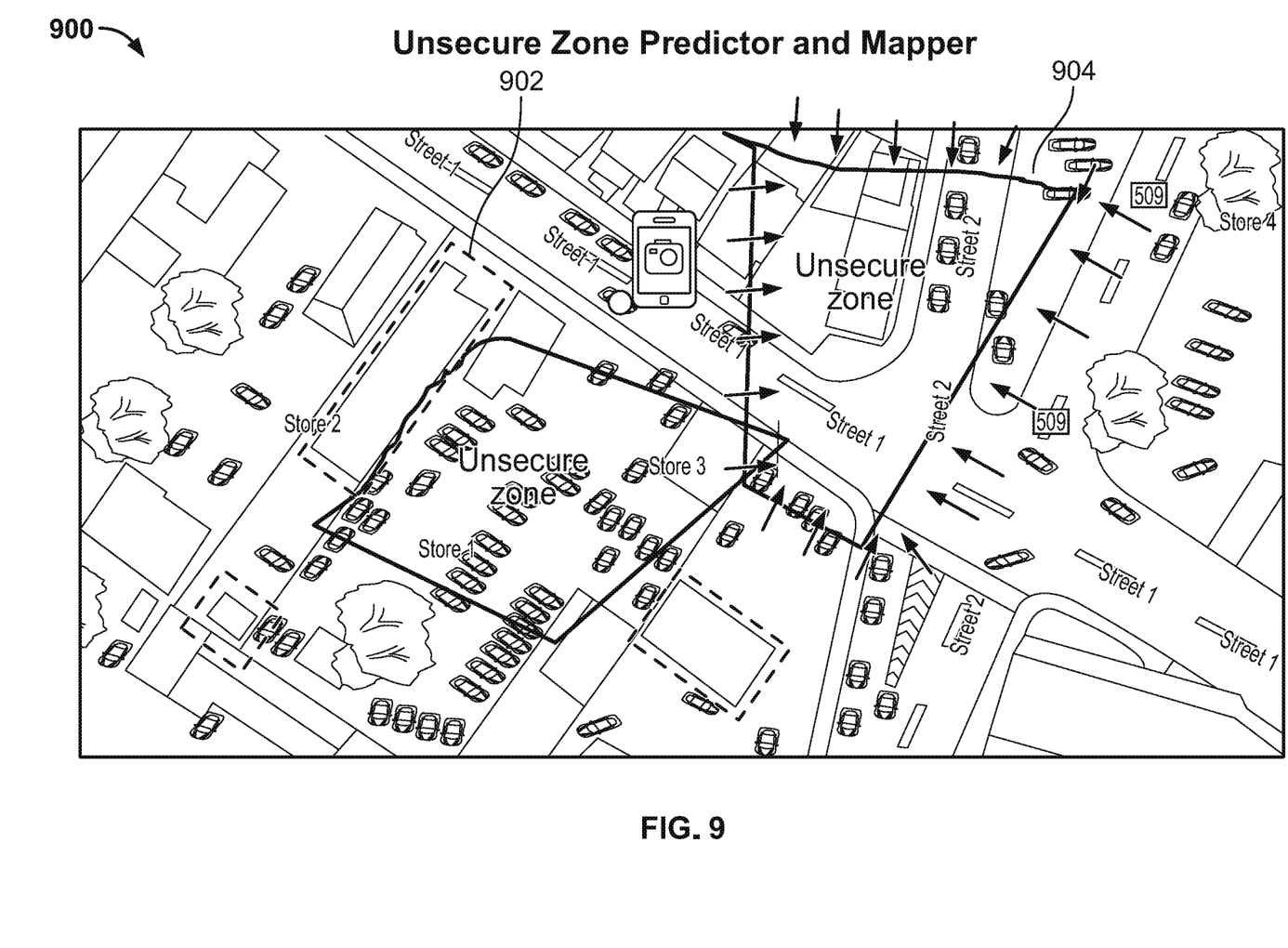
FIG. 9 shows illustrative information in accordance with principles of the invention.

FIG. 9 shows illustrative view 900. View 900 may include a projection such as projection 708 (shown in FIG. 7). The projection may include unsecure zones such as 902 and 904. For each of the zones, the user may use the mobile computing device to accept a deactivation recommendation in the zone or reject the recommendation.

Figure 10:
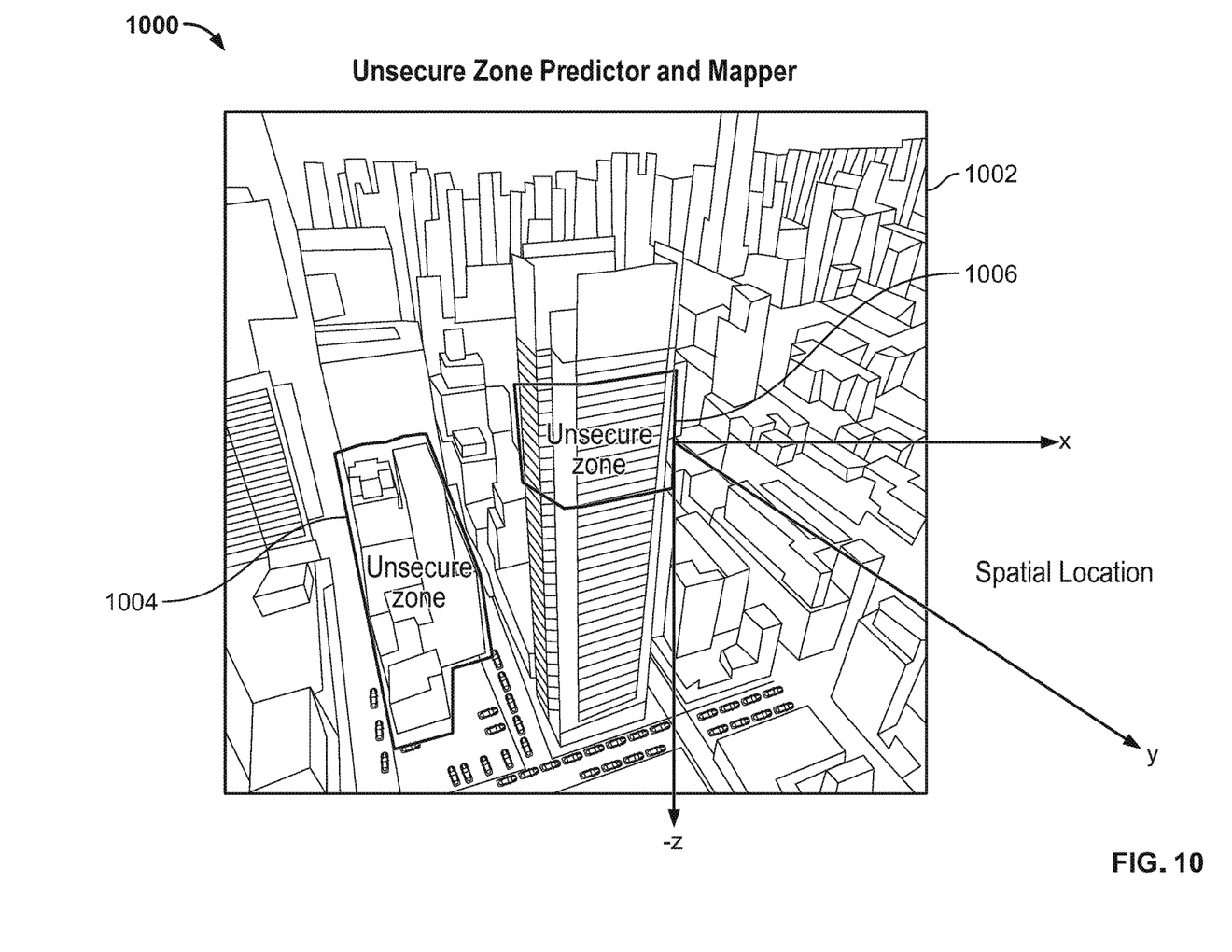
FIG. 10 shows illustrative information in accordance with principles of the invention.

FIG. 10 shows illustrative view 1000 of illustrative projection 1002. Projection 1002 may be rendered in three spatial dimensions: x, y and z (shown in the negative for convenience). Projection 1002 may include illustrative zones 1004 and 1006, one or both of which may be rendered in the three spatial dimensions. Zones 1004 and 1006 are illustrated as being unsecure zones. The labeling of the zones as unsecure may include a recommendation to deactivate the card in the zones.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, apparatus and methods for securing a communication link have been provided. Persons skilled in the art will appreciate that the present invention may be practiced by other than the described embodiments, which are presented for purposes of illustration rather than of limitation. The present invention is limited only by the claims that follow.

What is claimed is:
1. Apparatus for securing a communication link, the apparatus including:
    a microprocessor;
    a memory cell;
    a photovoltaic circuit;
    a radio frequency transceiver circuit;
    an ultra-high frequency ("UHF") active radio frequency identification ("RFID") circuit; and
    an organic light emitting diode display circuit;
wherein:
    the microprocessor, memory cell, photovoltaic circuit, radio frequency transceiver UHF RFID circuit and organic light emitting diode display are embedded in an information card;
    the photovoltaic circuit is configured to provide power to the display circuit;
    the radio frequency transceiver circuit is configured to:
        receive a radio frequency signal from a mobile computing device; and
        responsive to the signal, transmit a DISPLAY ON instruction to the microprocessor; and the microprocessor is configured to flow charge from the photovoltaic circuit to the display circuit responsive to the DISPLAY ON instruction.

2. The apparatus of claim 1 wherein the photovoltaic circuit includes:
a photovoltaic cell; and
a charge reservoir.

3. The apparatus of claim 1 wherein:
the information card conforms to dimensions defined in ISO/IEC 7810; and
the microprocessor, memory cell, photovoltaic cell, radio frequency transceiver and organic light emitting diode display circuit are disposed within the dimensions; and
the dimensions include:
a thickness;
a length; and
a width.

4. The apparatus of claim 1 wherein the display circuit includes:
an array of separately excitable diode fields; and
a display controller that is in electronic communication with each of the fields.

5. The apparatus of claim 4 wherein:
the microprocessor is configured to provide to the display circuit, after the fields are energized, a digital code; and
the display controller is configured to render the code optically in the fields.

6. The apparatus of claim 5 wherein the fields display a color palette corresponding to the code.

7. The apparatus of claim 5 wherein:
the radio frequency signal is a first radio frequency signal;
the digital code is a first digital code;
the radio frequency transceiver circuit is configured to receive a second radio frequency signal from the mobile computing device after the first radio frequency signal is interrupted;
the microprocessor is configured to provide to the display circuit a second digital code; and
the second digital code is different from the first digital code.

8. A method of securing the communication link, the method comprising:
at a communications platform, receiving a location of the card of the apparatus defined in claim 1;
determining that the card does not conform to the activation file; and
deactivating the card.

9. The method of claim 8 further comprising providing the location from the UHF active RFID circuit to the platform.

10. The method of claim 9 further comprising, before providing the location, wirelessly verifying, at the mobile computing device, that the information card is no more than a predetermined distance from the device.

11. The method of claim 8 further comprising:
receiving at a mobile computing device a multi-spectral optical pattern from the apparatus defined in claim 1;
deriving, at the mobile computing device, from the optical pattern, a digital request key;
wirelessly transmitting the key from the mobile computing device to a communication control platform; and
receiving from the platform, at the mobile computing device an authentication key that corresponds to the request key.

12. The method of claim 11 further comprising:
receiving at the mobile computing device a touch-screen instruction to activate the information card; and
responsive to the touch-screen instruction, generating an activation file includes activation parameters that circumscribe information card activity.

13. The method of claim 12 further comprising transmitting the activation file from the mobile computing device to the platform an activation file.

14. The method of claim 12 wherein the file includes a geographic limiter.

15. The method of claim 14 wherein the geographic limiter includes a distance relative to the mobile computing device.

16. The method of claim 14 further comprising receiving at the mobile computing device a touch-screen coordinate corresponding to a map location.

17. The method of claim 16 wherein:
the touch-screen coordinate is of a plurality of touch-screen coordinates that correspond to a plurality of map locations; and
the map locations define an enclosed map region.

18. The method of claim 14 wherein the geographic limiter includes a cartographic attribute.

19. The method of claim 18 wherein the cartographic attribute includes a place name.

20. The method of claim 12 wherein the file includes an altitude limiter.

21. The method of claim 20 wherein the altitude limiter includes a height relative to the mobile computing device.

22. The method of claim 20 wherein the altitude limiter includes a floor number.

23. The method of claim 12 wherein the file includes a temporal limiter.

24. The method of claim 23 wherein the temporal limit includes a calendar attribute.

25. The method of claim 23 wherein the calendar attribute includes a date.

26. The method of claim 12 wherein the file includes a request for a predetermined security profile.

27. A communications platform for securing a communication link, the platform including:
a microprocessor;
a memory cell;
a photovoltaic circuit;
a radio frequency transceiver circuit;
an ultra-high frequency ("UHF") active radio frequency identification ("RFID") circuit; and
an organic light emitting diode display circuit;
wherein:
the microprocessor, memory cell, photovoltaic circuit, radio frequency transceiver UHF RFID circuit and organic light emitting diode display are embedded in an information card;
the photovoltaic circuit is configured to provide power to the display circuit;
the communications platform is configured to:
receive a location of the information card;
determine that the card does not conform to the activation file; and
following the determination that the card does not conform to the activation file, deactivate the card.

* * * * *